July 28, 1959  W. L. MINARIK  2,897,062
GAS REACTOR
Filed Feb. 5, 1954  2 Sheets-Sheet 1
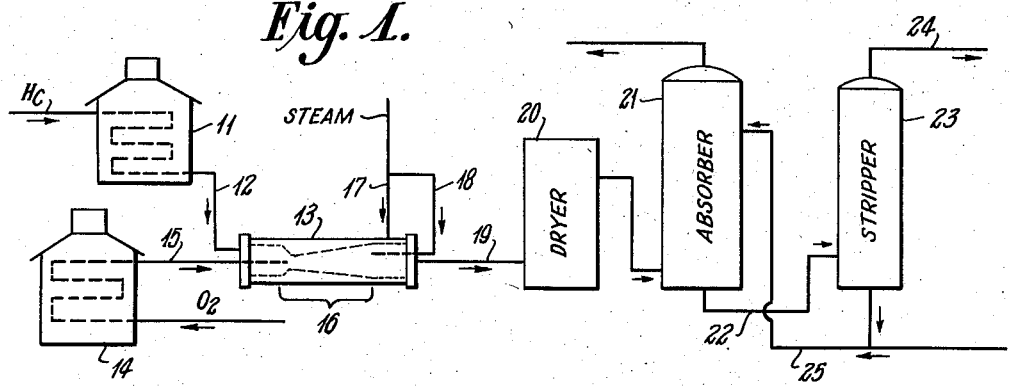
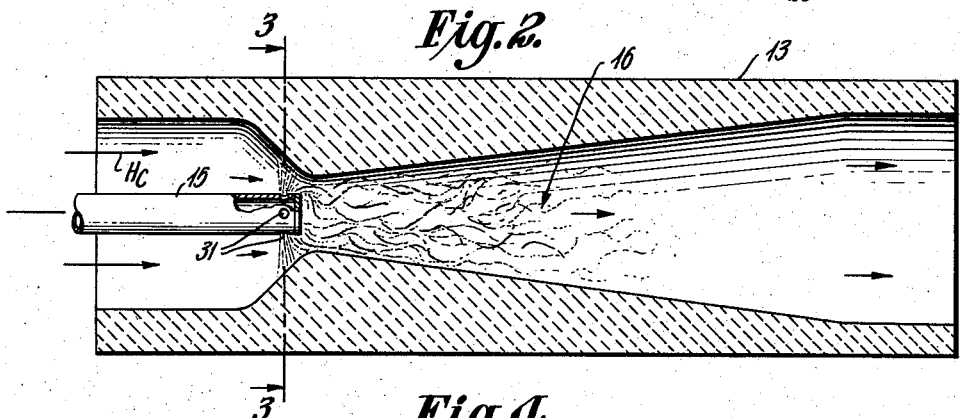
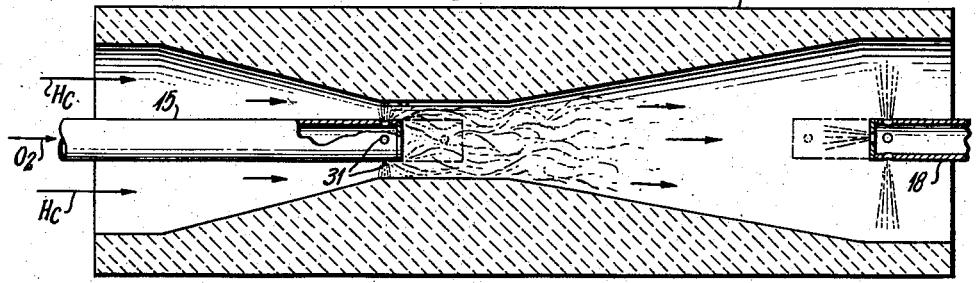
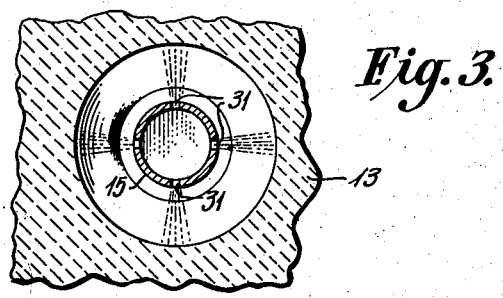
INVENTOR.
W. L. Minarik
BY Hudson and Young
ATTORNEYS

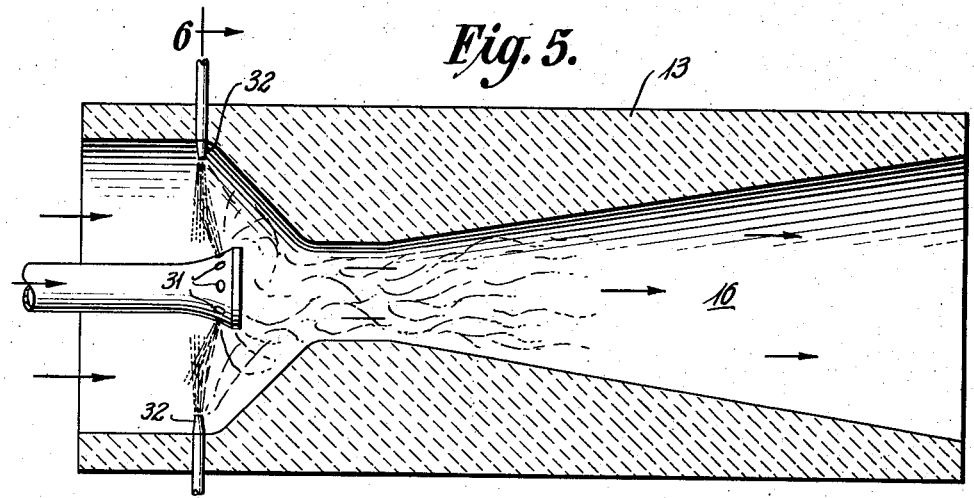
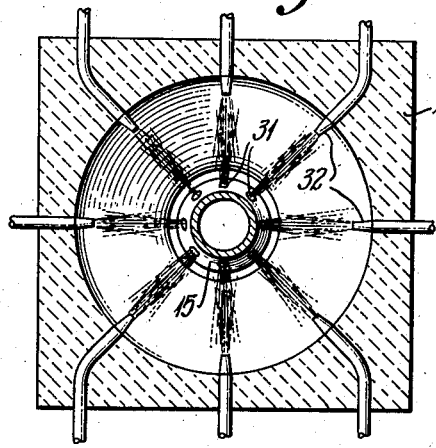
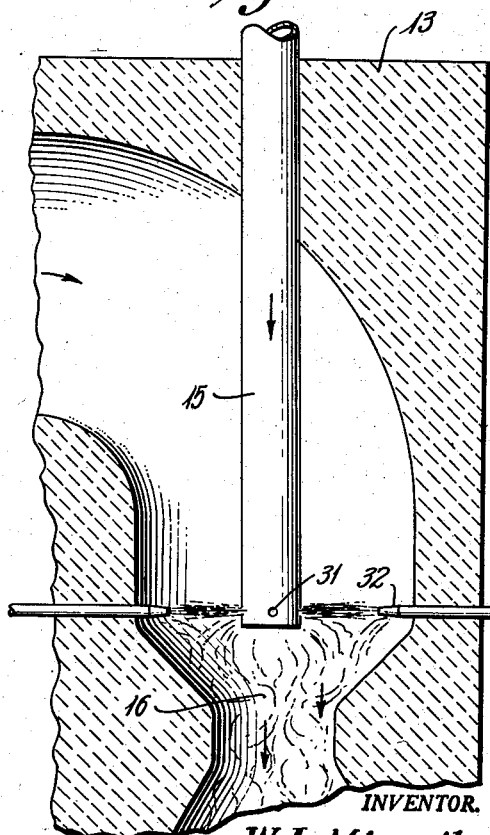
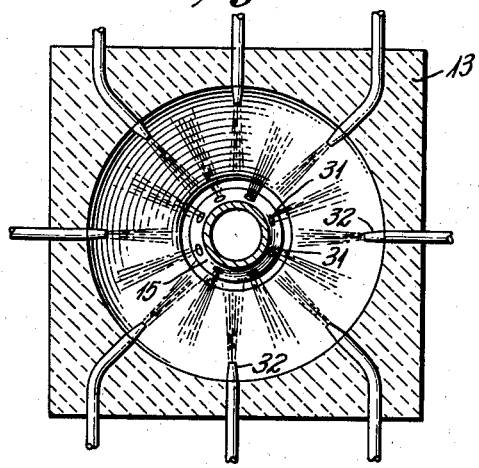

United States Patent Office 2,897,062
Patented July 28, 1959

2,897,062
GAS REACTOR

William L. Minarik, Minneapolis, Minn., assignor to Phillips Petroleum Company, a corporation of Delaware Application February 5, 1954, Serial No. 408,528

4 Claims. (Cl. 23—277)

This invention relates to an improved gas reactor. In one of its more specific aspects it relates to an improved reactor adapted for use in a partial oxidation process for the production of unsaturated hydrocarbons. In another of its more specific aspects, it relates to a gas reactor wherein the degree of mixing of the reactant gases and the reaction time can be varied.

Unsaturated hydrocarbons derived from the cracking of low boiling hydrocarbons provide a valuable source of starting material for the petro-chemical industry. The requirements of industry for organic compounds which are produced from unsaturated hydrocarbons has increased to the point where the demand for the starting materials is greater than the supply.

Various methods have recently been advanced for the gaseous phase cracking of low boiling hydrocarbons which produce unsaturated hydrocarbons in general and acetylenes in particular, however, for the most part these processes have failed to produce unsaturated hydrocarbons satisfactorily or at a cost which permits their production in competition to other methods already developed.

Copending application Serial No. 370,296, filed July 27, 1953, by Donald K. MacQueen, now Patent No. 2,813,138, discloses and claims a novel reactor for the production of acetylenes and other unsaturated hydrocarbons which has produced especially favorable acetylene yields. This reactor comprises a conduit containing a venturi section through which the hydrocarbon gases flow axially. The oxidant is introduced adjacent the venturi through a plurality of pairs of opposed gas inlet jets, preferably radially disposed, and diametrically opposed. MacQueen has demonstrated that high acetylene yields are obtainable by introducing oxygen into a hydrocarbon stream by means of radially opposed jets at or near the vena contracta of a venturi mixer. The reactor of this invention is an improvement over the MacQueen reactor and provides a flexible and efficient reactor for the treatment of a variety of reactant gases over a large range of variable conditions.

Each of the following objects will be attained by at least one of the aspects of the invention.

It is an object of this invention to provide an improved reactor for the production of unsaturated hydrocarbons.

It is another object to provide an improved reactor for the production of acetylenes, olefins, and aromatics.

Another object is the provision of an improved reactor for contacting two or more reactant gases.

It is another object to provide an improved reactor wherein the point of internal, radial introduction of a reactant gas can be varied.

It is another object to provide an improved reactor of large diameter wherein desired contact of reactant gases is obtained substantially throughout the entire cross-section of the reactor.

It is still another object to provide an improved reactor employing both internal and peripheral introduction of one or more of the reactant gases radially to the reactor.

It is still another object to provide an improved reactor wherein the point of quenching the reaction can be varied.

Other objects and advantages will be apparent to one skilled in the art upon studying this disclosure and the accompanying drawing.

In the drawings

Figure 1 is a schematic sectional view of a process wherein the reactor of this invention is employed.

Figure 2 is a sectional view of a preferred embodiment of the reactor of this invention.

Figure 3 is a plan view taken along the line 3—3 of Figure 2.

Figure 4 is a sectional view of a preferred form of the reactor of this invention where a slightly different venturi section is employed.

Figure 5 is a sectional view of another preferred form of the reactor of this invention.

Figure 6 is a plan view taken along the lines 6—6 of Figure 5.

Figure 7 is a sectional view of a modification of this invention.

Figure 8 is a plan view similar to Figure 6 showing a modification of this invention.

An extremely short reaction time is required for the production of acetylene by the thermal decomposition of gaseous hydrocarbons. It is also necessary to stop the reaction immediately after the acetylene is formed because, although the reaction is not reversible, side reactions occur with great rapidity and therefore it is necessary to stop the reaction quickly in order to avoid these side reactions. Since the reaction time required for the production of acetylenes is quite short, it is therefore necessary that very good mixing takes place in order to assure contact of the reactant materials in the short space of contact time allowed for a high yield of acetylene.

I have invented an improved reactor which provides great flexibility in the degree of mixing achieved and in the reaction time obtained and thus is applicable to the production of acetylenes by the thermal decomposition of hydrocarbon gases and is also applicable to the production of unsaturated hydrocarbons wherein a longer reaction time is necessary. The reactor of my invention comprises a conduit having a venturi section therein, and having a longitudinally variable means for introducing one of these reactant gases radially into the reactor adjacent the venturi section. My reactor also provides a source of quench medium which is introduced at a point downstream from the venturi and which is adjustable longitudinally. My reactor also provides peripheral jets for the introduction of a reactant gas in addition to the axial introduction of reactant gas for use in large diameter reactors. My invention also contemplates the use of a plurality of internally introduced radial jets when a single axial introduction of radial jets is not sufficient to cover a sufficient amount of the cross section of the venturi.

Referring now to the drawing and particularly to Figure 1, as applied to a process for the partial oxidation of hydrocarbons, a hydrocarbon feed is heated in heater 11 and passes through line 12 axially into reactor 13. The oxidizing stream which can be air or oxygen or a stream of gas containing free oxygen is heated in heater 14 and passes thru line 15 which projects axially into reactor 13 and introduces the oxidizing gas radially into the reactor adjacent the venturi which is indicated at 16. Downstream from venturi section 16 a stream or water quench is introduced radially thru line 17 or thru line 18. The reaction product, unreacted hydrocarbons, and steam, are removed from the reactor thru line 19 and passed through dryer 20 to absorber 21 where the desired products are absorbed in a suitable solvent and are then passed thru line 22 to stripper 23 wherein the desired products are taken overhead to line 24 and the denuded solvent is returned to absorber 21 thru line 25.

Figure 2 is a sectional view of a preferred embodiment of the invention as applied to a venturi having a relatively short and abrupt converging section. Line 15 is adapted so as to be longitudinally movable so that axial jets 31 which are disposed about the end of line 15 can be situated within the throat of venturi 16, or can be placed upstream from the throat of venturi 16. Jets 31 are adapted to introduce the oxidizing gas radially into the hydrocarbon stream and in Figure 2 are shown disposed slightly upstream from the throat of venturi 16. The location of jets 31 with respect to the throat of venturi 16 will depend upon the velocity of the hydrocarbon stream and will also depend upon the reaction desired. As the velocity of the hydrocarbon stream is increased, jets 31 will normally be moved upstream from the throat of the venturi so as to provide the required reaction time within the venturi section of reactor 13 and to prevent the radial jets of oxidizing gas from being unduly deflected downstream.

Figure 4 is a sectional elevation of the invention as applied to a venturi having a gradually converging section and shows jets 31 disposed at the upstream end of the throat of the venturi. The reaction time is controlled principally by location of introduction of the quench which is shown being introduced into the downstream portion of reactor 13 by adjustable line 18.

Figure 5 is a sectional elevation of a preferred embodiment of the invention as applied to a reactor of large diameter wherein peripheral jets 32 introduce an oxidizing gas radially into the reactor in addition to the axial jets 31. The peripheral jets may oppose the axial jets as shown in Figure 6 or may be alternated with the axial jets as shown in Figure 8. The axial jets or peripheral jets or both can be directed slightly upstream where high lineal gas flow is contemplated.

Figure 7 shows a modification of this invention wherein the hydrocarbon stream is caused to perform a right angle turn upstream from the venturi so as to provide added turbulence to the hydrocarbon stream.

The improved reactor of my invention provides a means for the efficient contacting of a plurality of reactant gases and provides a flexible means for varying the conditions under which such reactant gases are contacted and reacted. The degree of mixing of the reactant gases can be closely controlled by properly choosing the point at which the radially introduced gas is introduced into the axially flowing gas. Thus for more thorough and complete mixing of the gases and/or longer reaction time the radial stream is introduced upstream from the throat of the venturi in the reactor and for quicker although less thorough mixing the radial gas is introduced at the upstream end of, or within the throat of the venturi dependent upon gas velocity and/or reactor size. The time allowed for the reaction of the reactant gases also can be closely controlled by positioning the introduction of the quench stream downstream from the venturi, thus for shorter reaction time the quench is introduced at a point nearer the throat of the venturi.

The production of acetylene by the thermal decomposition of gaseous hydrocarbons requires high temperatures, rapid mixing, and short contact time. These conditions are provided by my improved reactor wherein the preheated oxidizing stream is introduced radially into the preheated hydrocarbon stream from the axis of the hydrocarbon stream at or slightly above the throat of a venturi having a short throat section such as shown in Figure 2 so that rapid mixing and partial combustion results. The required short reaction time is obtained by moving the point of introduction of quench toward the throat of the venturi.

In the production of olefins and other unsaturates which requires a longer reaction time, the oxidizing stream is preferably introduced radially from the axis of the reactor at a point upstream from the throat of the venturi and can be upstream from the venturi itself. In such reactions a venturi having a longer throat can be advantageously used such as is illustrated in Figure 4. In order to increase the reaction time the point of quench is moved downstream from the throat of the venturi. In the various processes in which the improved reactor of this invention is employed the reaction temperatures vary from about 1400° F. to 2700° F. and even higher while the reaction times are in the range of about .0005 second to about 2 seconds. A refractory material capable of withstanding these contemplated high temperatures, such as mullite, alumina, zirconia or silicon carbide, is utilized to line the interior of the reactor. The axially disposed conduit containing the jets for the radial introduction of the oxidizing gas into the axially flowing stream can also be constructed of a refractory material similar to that mentioned above. However, this conduit can be constructed of metal since it is not subjected to a temperature higher than the preheat temperature because the gases are swept downstream from the point of introduction before combustion takes place.

The peripheral fluid inlet jets can also be constructed of either refractory material or a metal.

In the operation of the improved reactor of this invention in the process for the production of unsaturated hydrocarbon, a hydrocarbon feed is passed through a heater where it is heated above the ignition temperature. The preheated hydrocarbon feed flows through the reactor conduit and through the venturi. In flowing through the venturi, the gas undergoes a pressure drop with the result that it is moving through the venturi throat at a greatly accelerated velocity. An oxidant is passed through a heater and it also is heated to a temperature near that of the preheated hydrocarbon. The preheated oxidant is injected into the hydrocarbon stream radially from the axial conduit extending into the reactor and terminating at or near the vena contracta of the venturi. A highly turbulent condition is thereby created in the venturi, resulting in a rapid and uniform mixing of oxidant and hydrocarbon feed. The combustible mixture so formed immediately burns, the hydrocarbons undergoing an incomplete combustion. Since the partial oxidation reaction is exothermic, the temperature in the throat of the venturi is rapidly raised to the temperature required for forming the unsaturated hydrocarbon desired. The remainder of the hydrocarbon, that is that portion not converted in the partial oxidation reaction, undergoes a cracking reaction in the throat of the venturi. The effluent gas is thereafter immediately quenched to a temperature at which the unsaturated hydrocarbon is stable, by quenching with steam or water or a combination of the two.

The hydrocarbon or reactant stream, alternatively, can be introduced axially and radially into oxidant stream passed lineally through the reactor of this invention.

Steam or other diluent can be added with either the hydrocarbon stream or oxidant stream or both or can be added separately if desired.

Variations and modifications are possible within the scope of the disclosure of the present invention, the essence of which is the provision of an improved gas reactor wherein a first reactant gas is introduced axially and radially into a second gas stream passing through a venturi and then quenched, and, wherein the points of introduction of the first gas stream, and the quench, can be varied with respect to the venturi.

I claim:

1. A gas reactor comprising a first conduit open at each end and adapted for flow of fluid therethrough; a venturi section in said conduit comprising a converging section, a throat section and a diverging section; a longitudinally movable second conduit terminating in a closed end and coaxially disposed within said first conduit with its closed end within the converging section of said venturi section and longitudinally movable from said position to a position within the throat of said venturi section; a plurality of passageways through said second conduit disposed radially around said second conduit adjacent its closed end; a plurality of gas passageways through said first conduit in radial alignment with the passageways in said second conduit; a third conduit disposed coaxially within said first conduit and terminating in a closed end adjacent the diverging section of said venturi section; and a plurality of passageways through said third conduit disposed radially around and adjacent its closed end and a passageway through its closed end.

2. A gas reactor comprising a first conduit having an open inlet end and an open outlet end; an abruptly venturi section comprising a converging section, a throat section and a gradually diverging section disposed in said conduit intermediate the two ends; a second conduit terminating in a closed end and disposed coaxially within said first conduit with its closed end adjacent the junction of said converging section and said throat section of said venturi section and being longitudinally movable into said throat section and into said converging section; a plurality of passageways through said second conduit disposed radially around said second conduit adjacent its closed end; a third conduit disposed coaxially within said first conduit and terminating in a closed end adjacent the diverging section of said venturi section; and a plurality of passageways through said third conduit disposed radially around and adjacent its closed end and a passageway through its closed end.

3. A gas reactor comprising a first conduit adapted for flow of fluid therethrough; a venturi section in said conduit comprising a converging section, a throat section and a diverging section; a longitudinally movable second conduit terminating in a closed end and disposed coaxially within said first conduit with its closed end adjacent the junction of said converging section and said throat section of said venturi section and longitudinally movable from said position to a position within the throat of said venturi section; a longitudinally movable third conduit terminating in a closed end and disposed coaxially within said first conduit with its closed end adjacent the diverging section of said venturi section; a plurality of passageways through said second conduit disposed radially around said second conduit adjacent its closed end; and a plurality of passageways through said third conduit disposed radially around said third conduit adjacent its closed end and a passageway through its closed end.

4. A gas reactor comprising a first conduit adapted for flow of fluid therethrough; a venturi section in said conduit comprising a converging section, a throat section and a diverging section; a longitudinally movable second conduit terminating in an outwardly flared and closed end disposed coaxially within said first conduit with its outwardly flared closed end adjacent the converging section of said venturi section and longitudinally movable from said position to a position within the throat of said venturi section; and a plurality of passageways through said flared section at said closed end of said second conduit and disposed radially around said second conduit adjacent its closed end.

References Cited in the file of this patent
UNITED STATES PATENTS

| | | |
|---|---|---|
| 2,368,827 | Hanson et al. | Feb. 6, 1945 |
| 2,394,849 | Doumani et al. | Feb. 12, 1946 |
| 2,529,873 | Heller | Nov. 14, 1950 |
| 2,608,594 | Robinson | Aug. 26, 1952 |
| 2,628,674 | Fore | Feb. 17, 1953 |

UNITED STATES PATENT OFFICE
CERTIFICATE OF CORRECTION

Patent No. 2,897,062                        July 28, 1959

William L. Minarik

It is hereby certified that error appears in the printed specification of the above numbered patent requiring correction and that the said Letters Patent should read as corrected below.

Column 2, line 67, for "stream" read -- steam --; column 5, line 18, for "end; an abruptly ven-" read -- end; a ven- --; line 19, for "a converging" read -- an abruptly converging --.

Signed and sealed this 23rd day of February 1960.

(SEAL)
Attest:

KARL H. AXLINE
Attesting Officer

ROBERT C. WATSON
Commissioner of Patents